United States Patent [19]

Modic et al.

[11] Patent Number: 4,762,859

[45] Date of Patent: Aug. 9, 1988

[54] LOW DENSITY SILICONE FOAM

[75] Inventors: Frank J. Modic, Scotia; Richard A. Striker, Troy, both of N.Y.

[73] Assignee: General Electric Company, Waterford, N.Y.

[21] Appl. No.: 113,023

[22] Filed: Oct. 26, 1987

[51] Int. Cl.$^4$ .............................................. C08J 9/02
[52] U.S. Cl. ........................................ 521/82; 521/91;
521/94; 521/110; 521/122; 521/134; 521/154;
528/15; 528/31; 528/32
[58] Field of Search ................. 521/154, 82, 134, 122,
521/94, 91, 110; 528/15, 31, 32

[56] References Cited

U.S. PATENT DOCUMENTS

| | | | |
|---|---|---|---|
| 3,024,126 | 3/1962 | Brown | 106/308 |
| 3,635,743 | 1/1972 | Smith | 106/288 |
| 3,837,878 | 9/1974 | Beers | 106/308 |
| 3,923,705 | 12/1975 | Smith | 260/2.5 S |
| 4,189,545 | 2/1980 | Modic | 521/131 |
| 4,418,157 | 3/1983 | Modic | 521/82 |
| 4,613,630 | 9/1986 | Bauman et al. | 521/134 |

FOREIGN PATENT DOCUMENTS

GB2065661 7/1981 United Kingdom .

Primary Examiner—Morton Foelak
Attorney, Agent, or Firm—John W. Harbour

[57] ABSTRACT

Treated filler having surface nitrogen groups is added to silicone foam to reduce density.

48 Claims, No Drawings

LOW DENSITY SILICONE FOAM

The present invention relates to low density silicone foam. More particularly, the present invention relates to low density silicone foam which is produced by simultaneous vinyl addition and hydride/hydroxy reactions in the presence of certain amine compounds.

BACKGROUND OF THE INVENTION

Elastomeric silicone foams are well known and have a variety of uses, including thermal insulation, electrical insulation, flame barrier, cushioning applications, etc. Elastomeric silicone foams have excellent physical properties and in addition to the above uses are suitable and desirable for use in many additional applications. However, there is a problem with elastomeric silicone foam that it is expensive and at 15–25 lb/ft$^3$, the ability to reduce price is limited by the basic costs of silicone material.

The technical advances necessary to significantly reduce the basic cost of silicone material are not on the horizon, thus it is clear that to immediately reduce the cost of elastomeric silicone foam it is necessary to reduce the density of the foam. Although this may seem to be a simple matter of adding additional blowing agent, etc., it is an aspect of elastomeric silicone foam as presently used that density is not easily lowered. The reasons for this are apparent with a review of silicone foam technology.

U.S. Pat. No. 3,923,705, Smith, discloses that elastomeric silicone foams may be produced with a single reaction that both cross-links to cure the composition as well as produces hydrogen gas to blow the foam. This reaction takes place between a silanol and silicon hydride. Optionally, there can be added a vinyl containing silicone that will simultaneously cross-link through addition with a silicon hydride without gas generation. Obviously, this is a convenient method to produce silicone foam. It is also true, however, that gas generation must be proportional to cross-linking or cure rate and therefore density is difficult to control.

U.S. Pat. No. 4,189,545, Modic, produces silicone foam compositions by adding water. For example, water could be added to a composition of a vinyl containing siloxane, a hydride containing siloxane and platinum to generate gas at a rate only indirectly related to cross-linking rate. The water reacts with hydride containing siloxane to produce hydrogen gas and silanol. Silanol reacts with hydride containing siloxane to cross-link and produce a second molecule of hydrogen gas. A vinyl addition reaction with silicone hydride will cross-link the composition simultaneously. Thus, a major advantage of Modic is that gas is produced without the addition of silanol and with only small amounts of water.

U.S. Pat. No. 4,418,157, Modic, reduces density and strengthens silicone foam by adding a resinous copolymer. U.S. Pat. No. 4,599,367, Baumann, et al., reduces density by using a combination of silanol and water.

Accordingly, it is desirable to modify the elastomeric silicone foams in use so that the self-blowing characteristics can be retained yet controlled independently of cure. It is also desirable that appropriate cell size be maintained with increased gas generation and that foam strength and other physical properties are not more than proportionally effected at lower elastomeric silicone foam densities.

Therefore, it is an object of the present invention to produce an elastomeric silicone foam having a reduced density.

It is another object of the present invention to produce such a foam with uniform cells and comparatively good strength and elongation.

It is yet another object of the present invention to produce a method to reduce the density of elastomeric silicone foam.

These and other objects of the present invention are accomplished by means of the disclosure set forth hereinbelow.

SUMMARY OF THE INVENTION

Briefly, there is provided by the present invention a foamable composition comprising:

A foamable composition comprising:

(a) 100 parts by weight of a vinyl-containing polysiloxane of the formula:

where R and $R^1$ are selected from substituted or unsubstituted hydrocarbon radicals of from 1 to 20 carbon atoms, such that the polymer contains from 0.0002 to 3% by weight vinyl and x varies such that the viscosity of the polymer varies from 100 to 1,000,000 centipoise at 25° C.;

(b) from 1 to 50 parts by weight of a hydride polysiloxane of the formula:

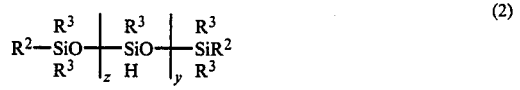

where $R^2$ is selected from the group consisting of independently, hydrogen, alkyl radicals of from 1 to 8 carbon atoms, aryl radicals of from 1 to 8 carbon atoms, haloalkyl radicals of 3 to 8 carbon atoms and simultaneously, a single —O— to form a cyclic polymer and $R^3$ is selected from the group consisting of alkyl radicals of from 1 to 8 carbon atoms, aryl radicals of from 1 to 8 carbon atoms, and fluoroalkyl radicals of 3 to 8 carbon atoms, where the hydride polysiloxane has a hydrogen content varying from 0.3 to 1.6% by weight and z and y vary such that the polymer has a viscosity varying from 1 to 500 centipoise at 25° C.;

(c) a hydroxyl source selected from the group consisting of water, organic alcohol, hydroxylated siloxane, and combinations thereof in an amount to provide a molar ratio of from about 0.02/1 to about 5/1 of hydroxyl radicals to silicon-bonded hydrogen atoms of component (b);

(d) from about 1 to about 250 parts per million of platinum catalyst; and (e) a sufficient amount of treated filler having sufficient visible nitrogen on its surface to lower foam density.

DETAILED DESCRIPTION OF THE INVENTION

In the vinyl-containing polysiloxane, component (a) as shown in formula (1) R and $R^1$ may be substituted or unsubstituted hydrocarbon radicals of from 1 to 20 carbon atoms with the proviso that there is controlled vinyl substitution and controlled viscosity. The vinyl substitution should range from about 0.0002 to 3% by weight and preferably, from about 0.001 to about 1% by weight. Viscosity should vary from about 100 to about 1,000,000 centipoise at 25° C. and preferably, from about 2500 to 500,000 centipoise. Although a polymer having a broader range of vinyl content will operate in the present invention, the more limited vinyl concentration given above will allow for a reaction that proceeds at an appropriate rate, that is not too slow and allows for proper cross-linking in the polymer to produce cured elastomeric silicone foam. With respect to the preferred range of viscosity, as can be appreciated, it is preferred that the viscosity not be too high, otherwise the composition is difficult to handle and will not foam well. The vinyl-containing polymer will form the major part of the foamable composition and thus the viscosity will be important to the viscosity of the final composition.

Substituted or unsubstituted hydrocarbon radicals of R and $R^1$ may be selected from alkyl radicals, methyl, ethyl, propyl, etc.; cycloalkyl radicals such as cyclohexyl, cycloheptyl, etc; mononuclear aryl radicals such as phenyl, methyl phenyl, ethylphenyl, etc.; alkenyl radicals such as vinyl, allyl, etc. and more preferably vinyl and other well known substituent groups for diorganopolysiloxane polymers. Preferably the R and $R^1$ radicals are selected from the class consisting of alkyl radicals of 1 to 8 carbon atoms, aryl radicals such as phenyl; vinyl radicals and halogenated hydrocarbon radicals such as fluoroalkyl radicals of 3 to 8 carbon atoms, such as, for instance 3,3,3-trifluoropropyl. Most preferably $R^1$ radicals are selected from methyl radicals, phenyl radicals, vinyl radicals and 3,3,3-trifluoropropyl radicals where the polymer has the foregoing vinyl substitution and R is vinyl. Although vinyl-containing polysiloxane where the vinyl units appear only on the siloxane chain can be used to produce silicone foam, the physical properties are not as good as where there is terminal vinyl substitution. A particularly preferred polymer has only terminal vinyl substitution, i.e. where R is vinyl and $R^1$ is methyl, phenyl, and/or 3,3,3-trifluoropropyl.

Vinyl-containing polysiloxanes are well known in the art and may be produced by a variety of methods, for instance, by equilibrating cyclic polysiloxanes with or without vinyl substitution in the presence of appropriate amounts of vinyl substituted chainstopper. Further details for production of vinyl-substituted polysiloxanes may be found in U.S. Pat. No. 3,425,967 to Modic. Further suitable vinyl-containing polysiloxanes may be found in U.S. Pat. No. 4,599,367; 4,418,157 and 3,923,705, all of which are incorporated herein by reference.

For each 100 parts by weight of vinyl-containing polysiloxane, component (a), there should be present in the foamable composition from about 1 to 50 parts by weight of hydride polysiloxane, component (b), and preferably, from about 5 to 30 parts by weight. As shown above in formula (2), $R^2$ may be independently hydrogen, an alkyl radical of from 1 to 8 carbon atoms, an aryl radical from 1 to 8 carbon atoms or a haloalkyl radical of 3 to 8 carbon atoms or simultaneously a single —O— to form a cyclic polymer and $R^3$ may be selected from the same radicals as $R^2$ absent hydrogen and oxygen. It is preferred that the hydride polysiloxane have a hydrogen content ranging from about 0.3 to about 1.6% by weight and as shown in formula (2), z and y vary to provide a viscosity ranging from 1 to 500 centipoise at 25° C. The hydride content is not critical but such a content substantially less than about 0.3% by weight of the hydride polysiloxane may not provide sufficient hydrogen in the foamable composition to react with the hydroxy source and liberate hydrogen gas as well as react and cross-link with vinyl molecules of the vinyl-containing polysiloxane. The result will of course be a poorly blown and undercured foam. Likewise, viscosity of the hydride polysiloxane is not critical, but higher viscosity materials may be difficult to obtain and utilize. Preferably, viscosity ranges from about 5 to about 250 centipoise at 25° C. and most preferably from about 5 to 100 centipoise.

As seen in formula (2) above, it is critical that the hydride polysiloxane contain hydrogen on the siloxane chain. It is optional that hydrogen atoms are a substituent on terminal siloxy atoms. If there are no hydrogen atoms in the polymer chain of the hydride polysiloxanes, then a proper silicone foam is not obtained. Accordingly, a hydride polymer with only hydrogen radicals on terminal siloxy atoms will not work to form a silicone foam in the composition of the instant case.

A hydroxyl source is necessary to properly blow the foamable composition. The source of hydroxyl may be selected from any of water, organic alcohol or silanol or mixtures thereof.

Suitable silanols include any hydroxylated organosiloxane or hydroxylated organosiloxane mixture having an average of 1 to 2.5 silicon-bonded hydroxyl radicals per molecule. The organo radicals can be any radical described above for R and $R^1$. The silanols may be homopolymers, copolymers or mixtures thereof. It is preferred that the silanol contain at least one organic radical in a molecule per silicon atom. Examples of suitable silanols include hydroxyl end-blocked polydimethylsiloxane, hydroxyl end-blocked polydiorganosiloxane having siloxane units of dimethylsiloxane and phenylmethylsiloxane, hydroxyl end-blocked polymethyl-3,3,3-trifluoropropylsiloxane and hydroxyl end-blocked polyorganosiloane having siloxane units of monomethylsiloxane, dimethylsiloxane, with the monomethylsiloxane units supplying "on-chain" hydroxyl groups. The silanol also includes mixtures of hydroxylated organosiloxane polymers and hydroxylated organosilanes, such as mixture of hydroxyl end-blocked polydimethylsiloxane and diphenylmethylsilanol.

Organic alcohols suitable for use herein may be substituted or unsubstituted, mono or polyols, preferably having from about 1 to 12 carbon atoms. Substituent groups may serve to increase the solubility of the alcohol or to improve the dispensability of an insoluble species. Preferred organic alcohols include ethanol, propanol, butanol, lauryl alcohol, octyl alcohol, ethylene glycol, etc.

Each of the above enumerated hydroxyl sources may react with hydrogen of the hydride polysiloxane to produce hydrogen gas. Although this reaction is common and required of any hydroxyl source utilized, the by-product of the reaction may differ and produce other benefits or require attention as known to the art. Water will react with the hydride function to produce a hydroxyl function which can further react with a second hydride to produce additional gas and a cross-link site. Thus, where water is employed, additional gas will be generated as a benefit, but gassing after cure may occur. Silanol, due to good solubility in the composition characteristically produces gas immediately but may lead to problems of premature gelation. Organic alcohol does not as easily react with the hydride function and thus is generally used in silanol or water combinations. Silanol and water combinations have also been found particularly beneficial. Persons skilled in the art are familiar with each of the above. For further teaching there are U.S. Pat. Nos. 4,189,545; 4,418,157; 4,599,367; and 3,923,705, hereby incorporated by reference.

Depending on the hydroxyl source used there should be from about 0.02/1 to about 5/1 moles hydroxyl radicals employed from the hydroxyl source for each silicon-bonded hydrogen atom in the hydride polysiloxane of component (b). Of course, this ratio is broadly stated, particularly at the upper boundary in view of the fact that hydride functions must be available to react with vinyl functions for cross-linking and should not be consumed by hydroxy functions. However, where water or difunctional hydroxyl compounds are used and much cross-linking takes place through hydroxy/hydride reactions or where vinyl concentration is very high, then the hydroxyl function to hydride function ratio may also be high. Preferably however, the ratio of hydroxyl radicals to hydride radicals should vary between about 0.02/1 to 1/1 and more preferably between about 0.05/1 to about 0.5/1.

Suitable platinum compound for use as the catalyst herein are well known. The preferred platinum catalysts are soluble in the present reaction mixture. The platinum compound can be selected from those having the formula $(PtCl_2.Olefin)_2$ and $H(PtCl_3.Olefin)$ as described in U.S. Pat. No. 3,159,601, Ashby. The olefin shown in the previous two formulas can be almost any type of olefin but is preferably an alkenylene having from 2 to 8 carbon atoms, a cycloalkenylene having from 5 to 7 carbon atoms or styrene. Specific olefins utilizable in the above formulas are ethylene, propylene, the various isomers of butylene, octylene, cyclopentene, cyclohexene, cycloheptene, etc.

A further platinum containing material usable in the composition of the present invention is the platinum chloride cyclopropane complex $(PtCl_2C_3H_6)_2$ described in U.S. Pat. No. 3,159,662, Ashby. Still further, the patent containing material can be a complex formed from chloroplatinic acid with up to 2 moles per gram of platinum of a member selected from the class consisting of alcohols, ethers, aldehydes and mixtures of the above as described in U.S. Pat. No. 3,220,972, Lamoreaux.

The preferred platinum compound to be used not only as a platinum catalyst, but also as a flame retardant additive is that disclosed in U.S. Pat. No. 3,775,452, Karstedt. Generally speaking, this type of platinum complex is formed by reacting chloroplatinic acid containing 4 moles of water of hydration with tetramethyl-tetravinylcyclosiloxane in the presence of sodium bicarbonate in an ethanol solution.

Finally, in the process of the instant case there is utilized generally from 1 to 250 parts per million of a platinum catalyst and more preferably 1 to 200 parts per million of a platinum catalyst. It is more preferred to utilize a stabilized platinum complex in the process of the instant case since it disperses in the ingredients much more easily and as such results in faster reaction time.

Generically fillers may be added in an amount of from 0.01 to 200 parts by weight. Component (e) herein includes that portion or amount of filler having sufficient surface nitrogen effective to lower foam density.

The precise nature of the surface nitrogen is not known although it can be created by methods shown below. The test herein for measuring surface nitrogen is the crystal violet test, also shown below, which is fundamentally a test for detecting certain bases on the surface of the treated filler. These detectable bases are assumed to be the "visible" nitrogen referred to herein. "Visible" nitrogen is assumed to correlate in some fashion to actual effective nitrogen and visible nitrogen on fumed silica is assumed to correlate to similar groups on other fillers. Persons skilled in the art are intended to interpret "visible" nitrogen in view of such correlations.

The amount of "visible" nitrogen on the surface of a filler is not critical as compared to its relative presence in the composition. Typically a filler might have from about 1 to about 2000 ppm visible nitrogen on its surface. It is preferred that the concentration of visible nitrogen not be so great on any particular filler particle that its distribution in the composition is localized. A typical effective treated filler will have from about 25 to 250 ppm visible nitrogen on its surface.

Of greater importance than visible nitrogen content on the filler is visible nitrogen content in the foamable composition. It is important herein that visible nitrogen content range on a weight basis from about 0.10 to about 7.0 ppm in the foamable composition based on silicone polymer content. Preferably visible nitrogen content should range from 0.2 to 5.0 ppm based on silicone polymer. Restated, visible nitrogen relative to platinum should range from a weight ratio of 0.003 to a ratio of 0.180 and more preferably from a ratio of 0.006 to a ratio of 0.12. Thus both treated filler amount and visible nitrogen treatment must be controlled to meet the above ratio under the above guidelines. A treated fumed silica having a visible nitrogen content of about 190 ppm will be added to a foamable composition in amounts ranging from about 0.06 to about 3.7 parts by weight for each 100 parts by weight silicone polymer catalyzed with 40 ppm platinum catalyst based on metal. Preferably such a filler might be added in amounts ranging from 0.12 to about 2.5 parts for each 100 parts by weight such silicone polymer. Other fillers may be added as desired.

Visible nitrogen may be formed on the surface of a filler according to the skill of the art. Such skill, it is believed, would require that the filler be treated in some fashion with a nitrogen containing compound. Treatment commonly involves simply heating the filler in the presence of the nitrogen containing compound. A less common treatment might involve exposing the filler and nitrogen containing compounds to an appropriate spectrum of radiation.

Preferred nitrogen containing compounds for filler treatment are amine or amino-silane compounds of the general formula:

$$NR_3^4$$

where $R^4$ is selected from the group consisting of hydrogen, hydroxyl, substituted or unsubstituted alkyl of from 1 to 18 carbon atoms, substituted or unsubstituted aryl of from 1 to 18 carbon atoms, or a substituted or unsubstituted silyl. As is well known in the art, amine compounds where more than one group is hydroxy are unstable and difficult to manufacture. Further, ammonia is not generally known as an amine. Thus, up to one $R^4$ may be hydroxy and up to two $R^4$ may be hydrogen or at least one $R^4$ must be selected from substituted or unsubstituted alkyl of from 1 to 18 carbon atoms, substituted or unsubstituted aryl of from 1 to 18 carbon atoms, and substituted or unsubstituted silyl.

Suitable amine compounds characterized by $R^4$ being hydroxyl, substituted or unsubstituted alkyl of from 1 to 18 carbon atoms, or substituted or unsubstituted aryl of from 1 to 18 carbon atoms include hydroxy amines, for example, diethyl hydroxyl amine and primary secondary and tertiary amines, for example, $H_2NC_3H_6Si(OEt)_3$, $H_2NC_3H_6NHC_3H_6Si(OCH_3)_3$, $(Me_2N)_2$—C≡$NC_3H_6Si(OCH_3)_3$, $(Me_2N)_2$—C≡$NC_4H_9$, tetramethylpiperidine, piperidine, N-Methylmorpholine, N,N-dimethylethylenediamine, N-Methylipiperidine, N-hexylamine, tributylamine, dibutylamine, cyclohexylamine, Di-n-hexylamine, triethylamine, benzylamine, dipropylamine, N-ethylphenylamine, dimethyl soya amines, tetramethyl guanidine, N-methylmorpholine, etc.

Suitable amine compounds characterized by $R^4$ being silyl include compounds where $R^4$ is a substituted or unsubstituted silyl hydrocarbon or monovalent silicone polymer. Preferred such amine compounds are the silyl hydrocarbon type including hexamethyldisilazane, $(CH_3)_3SiNHCH_3$, $(CH_3)_3SiNHC_2H_5$, $((CH_3)_3Si_2NCH_3$, $((C_2H_5)_3Si)_2NH$, $((CH_3)_2SiNH)_3$. As seen, $R^4$ may join to form cyclic structures.

Treated filler and filler utilized for its art known purpose are the same filler, except that treated filler contains visible nitrogen. The preferred filler for treatment is fumed or precipitated silica. However, any filler which is capable of accepting treatment with nitrogen containing compounds may be used. Such fillers include ground quartz, titanium dioxide, etc. with a more complete list given below. The treated filler must be included, ignoring its foam density reducing aspect, in any calculation of general filler content.

The filler generally may be either an extending or reinforcing filler. It should be noted that extending fillers are preferred since reinforcing fillers such as fumed silica and precipitated silica when incorporated into the composition in any concentration unduly increase the viscosity of the composition. The increased viscosity makes it difficult to handle and to pour the foamable composition. However, fumed silica and precipitated silica have the advantages of increasing the physical properties, that is, the Tensile Strength, as well as the Tear of the silicone elastomeric foam that is formed from the composition. The preferred treated filler is a reinforcing filler. Thus, the foamable composition preferably contains both a reinforcing filler and an extending filler.

Accordingly, in the more preferred embodiment of the instant case there is utilized from 10 to 100 parts of filler based on 100 parts of the vinyl-containing base polymer.

The filler may be selected from the class consisting of reinforcing fillers and extending fillers and, more preferably, just extending fillers. A preferred extending filler that may be utilized in the instant composition which does not unduly increase the viscosity of the uncured composition is ground quartz. Ground quartz has the additional advantage that to some extent it increases the burn resistance properties of the cured silicone foam that is produced from the composition. Other extending fillers that may be utilized in the instant composition are, for instance, titanium dioxide, lithopone, zinc oxide, zirconium silicate, silica aserogel, iron oxide, diatomaceous earth, calcium carbonate, glass fibers, magnesium oxide, chromic oxide, zirconium oxide, aluminum oxide, alpha quartz, calcined clay, carbon, graphite, etc.

In addition to treatment with amine compound the filler may be treated with any other compounds or compositions well known for surface treatment. It is known to surface treat fillers to keep viscosity increase in silicone compositions containing filler to a minimum. For instance, cyclic polysiloxanes are used for such a purpose as set forth in U.S. Pat. No. 2,938,009, Lucas, which is hereby incorporated by reference. However, this is only one method of treating fillers, and other methods and agents are available. Methods which treat filler with nitrogen containing compounds should be carefully considered as such filler may contribute to the critical amounts of visible nitrogen given above. U.S. Pat. No. 3,635,743 treats reinforcing filler with ammonia and hexamethyldisilazane. U.S. Pat. No. 3,024,126 treats reinforcing filler with organosilicon compound and a dissassociative amino compound or quaternary ammonium hydroxide. U.S. Pat. No. 3,837,878, Beers, treats reinforcing filler with hydroxyl amine, cyclic siloxane, and silyl nitrogen compound.

Such ingredients such as cyclic polysiloxanes may may also be utilized to treat extending fillers such as ground quartz with some advantage since such treatment does also alleviate the viscosity increase caused by extending fillers. However, as stated previously, the most preferred filler for utilization as a filler to produce silicone foam of the instant case, is ground quartz. Quartz enhances the burn resistant properties of the composition as well as imparting some enhanced physical properties to the final cured silicone foam.

Surface treating a filler with nitrogen containing compound, distinguishes from simply dispersing the nitrogen containing compound on the filler surface. For example, a filler may be simply dipped into amine compound or an appropriate solution of amine compound and dried with mild heat or vacuum. Some portion of the amine compound may or may not react with the filler surface, but this type of treatment would be equivalent to simply adding the amine compound as taught in copending application of the same assignee filed herewith, Ser. No. 113,292 filed 10-26-87. Treating with nitrogen containing compound, however, requires application of the filler, for example from solution or by vapor deposition, and applying severe conditions such as heat in the range of 100° C. to 200° C. for up to 24 hours as taught in U.S. Pat. No. 3,837,878, to Beers. Of course, the severe treating conditions along with the reactive surface chemistry of the filler will result in a chemical reaction of the amine compound with the surface of the filler. Producing groups similar to those produced in the heat treatment should be the object of any treating method. It is these groups which are believed to produce the density reducing effects in the amounts shown above. These groups differ in density reducing effect from the groups which are added or result upon the addition of compounds taught in the copending application.

The foamable composition is generally used and stored as a two-part composition. The platinum catalyst is incorporated, preferably, in the vinyl-containing polysiloxane. The hydroxyl source may be added to the vinyl-containing polysiloxane and incorporated in the hydride polysiloxane. Again, preferably, the hydroxyl source is incorporated into the vinyl-containing polysiloxane to prevent a chance of premature reaction, and since there is more vinyl-containing material, the incorporation is easier. It should also be appreciated that the hydroxyl source could constitute a third component. The treated filler, like the platinum catalyst, should be incorporated into the vinyl-containing polysiloxane. The amine compound may be dispersed on the surface of a filler and so added to the appropriate part of the composition. The amine compound is dispersed on a filler by simply dipping or spraying the filler with amine compound or solution and subsequently drying with gentle heat or vacuum.

When it is desired to form the silicone foam, the hydride polysiloxane is rapidly mixed with the vinyl-containing polysiloxane containing the hydroxyl source, platinum, and treated filler, and the composition is poured into the desired cavity and allowed to stand. The composition will begin to crosslink and generate gas simultaneously to blow and cure to an elastomeric silicone foam.

It is sometimes desired to have a certain amount of work life or pot life in the mixed composition prior to its cure. Accordingly, for such purposes, it is normal to use an inhibitor. It has been found that to the compositions of the instant case there is desirably used at least 200 parts per million based on the total composition of an inhibitor including a vinyl-containing cyclictetrasiloxane such as tetra methyl tetra-vinylcyclopolysiloxane, malleates or vinyl acetylene compounds. When added to the composition inhibitors give the composition some work life or pot life. Preferably inhibitors are added to the composition at a concentration of anywhere from 100 parts per million to 10,000 parts per million based on the total composition so as to give to the composition work life varying anywhere from 5 to 20 minutes at room temperature. Smaller amounts of inhibitor does not give an appreciable increase of work life at room temperature of the composition and larger amounts of the inhibitor may be used than 10,000 parts per million, per weight of the composition. However such has not been found to be necessary.

Of course additional additives for foam are well known. Pigment and glass fibers, etc. may be added according to the skill of the art. Particularly preferred additives are MQ or MDQ resins with vinyl functions to lower density and increase strength. The addition of these resins is described in U.S. Pat. No. 4,418,157 incorporated herein by reference.

EXAMPLES

The examples below are given for the purpose of illustrating the practice of the above invention. They are not given for any purpose of setting limitations and defining the scope of the invention as set forth in the specification and claims. All parts are by weight.

Ingredients

Silanol—Silanol end-stopped polydimethylsiloxane, 5.5% —OH
Vinyl silicone—Vinyl terminated polydimethylsiloxane mixture with $MD^{vinyl}Q$ resin, total viscosity 30,000 cps at 25° C., 0.5% vinyl
Filler A—10 micron ground quartz
Filler B—Ground $CaCO_3$
Pt catalyst—Karstedt platinum catalyst
Water—Deionized water
X-linker—66% polymethylhydrogensiloxane, 1.6% -H and 34% vinyl end-stopped polydimethylsiloxane, 80,000 cps.

Treated Filler A 100 parts by weight preheated fumed silica, Filler C, surface area 200 $m^2/g$ is placed in a reactor with 22 parts by weight octamethylcyclotetrasiloxane, $D_4$, at 275° C. The filler and $D_4$ are agitated at 275° C. for 25 minutes and subsequently stripped at temperature for 30 minutes with an inert gas. The filler should not visibly adsorb a methyl red indicator in solution. 100 parts by weight of the resultant $D_4$ fumed silica filler and 12 parts by weight of precipitated silica filler are added to a reactor, agitated and heated to 110° C. 1 part by weight of 0.085 molar HCl are added and agitation with heating is continued for 2½ hours. Pressure builds to 5-10 psig. Following 2½ hours, 17 parts by weight hexamethyldisilazane, 11 parts by weight hexamethylcyclotrisiloxane, and 3 parts by weight diethylhydroxylamine are pumped into the reactor without venting. Temperature is raised to 140°-150° C. and agitation with heating continued for 8 hours. The reactor is vented after 8 hours and 1.1 parts water are added. The reactor is sealed and agitated with heat for 2 additional hours. The reactor is vented and stripped with inert gas at 165° C.

Treated Filler B $D_4$ fumed silica filler is prepared as for Treated Filler A. 100 parts by weight of $D_4$ fumed silica filler are added to a reactor, agitated, and heated to 100° C. 1 part by weight water is added, the reactor vented, then sealed and heated to 110° C. with agitation for 2½ hours. The reactor is subsequently purged with ammonia, following which it is sealed and heated with agitation to 150° C. 16 parts by weight hexamethyldisilazane are added in three equal portions in two hour increments over 6 hours. After 6 hours the reactor is vented and 1 part by weight of water is added, the reactor sealed, and agitation continued for 1 hour at 150° C. The reactor is purged and cooled.

Treated Filler C

A precipitated silica, Filler D, having a surface area of 160 $m^2/g$ is surface treated in the manner of $D_4$ fumed silica filler in the production of Treated Filler B.

EXAMPLES

Part A and Part B compositions are blended from the ingredients as shown in the tables. These compositions are mixed with water, treated filler and silanol as appropriate in the proportions shown. The foam is allowed to expand at room temperature until cured. Gel time, which is the time at which the material becomes elastomeric and final density are measured.

EXAMPLES 1-7

The following Table 1 and examples 1-7 demonstrate critical treated filler levels in foamable compositions to obtain reduced foam density. Platinum catalyst level is based on vinyl silicone content.

TABLE 1

|  | Example | | | | | | |
|---|---|---|---|---|---|---|---|
|  | 1 | 2 | 3 | 4 | 5 | 6 | 7 |
| Part A | 98.0 | 97.9 | 97.8 | 97.5 | 97. | 96. | 94. |
| Vinyl Silicone | 71.5 | 71.5 | 71.5 | 71.5 | 71.5 | 71.5 | 71.5 |
| Filler A | 24.5 | 24.5 | 24.5 | 24.5 | 24.5 | 24.5 | 24.5 |

TABLE 1-continued

| | Example | | | | | | |
|---|---|---|---|---|---|---|---|
| | 1 | 2 | 3 | 4 | 5 | 6 | 7 |
| Filler B | 2.0 | 2.0 | 2.0 | 2.0 | 2.0 | 2.0 | 2.0 |
| Pt catalyst, ppm | 40.0 | 40.0 | 40.0 | 40.0 | 40.0 | 40.0 | 40.0 |
| Part B | 10.0 | 10.0 | 10.0 | 10.0 | 10.0 | 10.0 | 10.0 |
| X-linker | 10.0 | 10.0 | 10.0 | 10.0 | 10.0 | 10.0 | 10.0 |
| Water | 2.0 | 2.0 | 2.0 | 2.0 | 2.0 | 2.0 | 2.0 |
| Treated Filler A | 0.0 | 0.1 | 0.2 | 0.5 | 1.0 | 2.0 | 4.0 |
| Gel Time, sec. | 280.0 | 300.0 | 300.0 | 366.0 | 397.0 | 600.0 | 765.0 |
| Density, lb/ft$^3$ | 16.7 | 15.7 | 14.5 | 11.9 | 12.1 | 14.7 | 21.5 |

EXAMPLES 8-13

The following Table 2 and examples 8-13 show the effect where the filler is treated with hexamethyldisilazane. Platinum catalyst level is based on vinyl silicone content.

TABLE 2

| | Example | | | | | |
|---|---|---|---|---|---|---|
| | 8 | 9 | 10 | 11 | 12 | 13 |
| Part A | 96.0 | 95.0 | 98.0 | 96.0 | 96.0 | 94.0 |
| Vinyl Silicone | 70.0 | 69.3 | 71.5 | 70.0 | 70.0 | 68.9 |
| Filler A | 24.0 | 23.8 | 24.5 | 24.0 | 24.0 | 23.5 |
| Filler B | 2.0 | 1.9 | 2.0 | 2.0 | 2.0 | 1.9 |
| Pt catalyst, ppm | 40.0 | 40.0 | 40.0 | 40.0 | 40.0 | 40.0 |
| Part B | 10.0 | 10.0 | 10.0 | 10.0 | 10.0 | 10.0 |
| X-linker | 10.0 | 10.0 | 10.0 | 10.0 | 10.0 | 10.0 |
| Water | 2.0 | 2.0 | 2.0 | 2.0 | 2.0 | 2.0 |
| Silanol | 2.0 | 2.0 | — | — | — | — |
| Treated Filler B | — | 1.0 | — | 1.0 | 2.0 | 4.0 |
| Gel Time, sec. | 280.0 | 250.0 | 180.0 | 190.0 | 170.0 | 180.0 |
| Density, lb/ft$^3$ | 15.8 | 12.6 | 16.8 | 14.2 | 14.0 | 16.0 |

EXAMPLES 14-19

The following Table 3 shows the effect of various treated fillers as seen.

TABLE 3

| | Example | | | | | |
|---|---|---|---|---|---|---|
| | 14 | 15 | 16 | 17 | 18 | 19 |
| Part A | 98.5 | 98.5 | 98.5 | 98.5 | 98.5 | 98.5 |
| Vinyl Silicone | 71.9 | 71.9 | 71.9 | 71.9 | 71.9 | 71.9 |
| Filler A | 24.6 | 24.6 | 24.6 | 24.6 | 24.6 | 24.6 |
| Filler B | 2.0 | 2.0 | 2.0 | 2.0 | 2.0 | 2.0 |
| Pt catalyst, ppm | 40.0 | 40.0 | 40.0 | 40.0 | 40.0 | 40.0 |
| Part B | 10.0 | 10.0 | 10.0 | 10.0 | 10.0 | 10.0 |
| X-linker | 10.0 | 10.0 | 10.0 | 10.0 | 10.0 | 10.0 |
| Water | 2.0 | 2.0 | 2.0 | 2.0 | 2.0 | 2.0 |
| Treated Filler A | — | — | — | 1.0 | — | — |
| Treated Filler B | — | — | 1.0 | — | — | — |
| Treated Filler C | — | — | — | — | — | 1.0 |
| Filler C | — | 1.0 | — | — | — | — |
| Filler D | — | — | — | — | 1.0 | — |
| Gel Time, sec. | 157.0 | 138.0 | 150.0 | 240.0 | 260.0 | 360.0 |
| Density, lb/ft$^3$ | 17.5 | 17.7 | 14.7 | 11.2 | 15.6 | 14.4 |

Test for Nitrogen

To a 1800 ml 50/50 mixture of glacial acetic acid and toluene is added 4 drops of 0.5% crystal violet solution in glacial acetic acid. The resultant mixture is the indicator solution, purple in color. 100 ml of indicator solution are titrated, with 0.1N perchloric acid in glacial acetic acid until the indicator solution turns light blue. 2 grams of treated filler is added and stirred. The indicator solution turns purple upon the addition and is again titrated back to light blue with titrant, i.e. 0.1N perchloric acid in glacial acetic acid. The amount of perchloric acid determins the "visible" amines or nitrogen groups with use of crystal violet indicator.

Treated Fillers A and B were tested for visible amine according to the above method. Table 4 shows the test results and calculated "visible" nitrogen content.

TABLE IV

| | ml titrant | wght % "visible" N |
|---|---|---|
| Treated Filler A | 0.27 | 0.019 |
| Treated Filler B | 0.04 | 0.003 |

What is claimed is:
1. A foamable composition comprising:
(a) 100 parts by weight of a vinyl-containing polysiloxane of the formula:

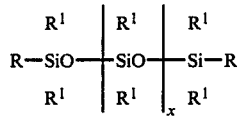

where R and R$^1$ are selected from substituted or unsubstituted hydrocarbon radicals of from 1 to 20 carbon atoms, such that the polymer contains from 0.0002 to 3% by weight vinyl and x varies such that the viscosity of the polymer varies from 100 to 1,000,000 centipoise at 25° C.;
(b) from 1 to 50 parts by weight of a hydride polysiloxane of the formula:

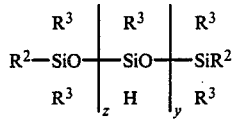

where R$^2$ is selected from the group consisting of independently, hydrogen, alkyl radicals of from 1 to 8 carbon atoms, aryl radicals of from 1 to 8 carbon atoms, haloalkyl radicals of 3 to 8 carbon atoms and simultaneously, a single —O— to form a cyclic polymer and R$^3$ is selected from the group consisting of alkyl radicals of from 1 to 8 carbon atoms, aryl radicals of from 1 to 8 carbon atoms, and fluoroalkyl radicals of 3 to 8 carbon atoms, where the hydride polysiloxane has a hydrogen content varying from 0.3 to 1.6% by weight and z and y vary such that the polymer has a viscosity varying from 1 to 500 centipoise at 25° C.;
(c) a hydroxyl source selected from the group consisting of water, organic alcohol, hydroxylated siloxane, and combinations thereof in an amount to provide a molar ratio of from about 0.02/1 to about 5/1 of hydroxyl radicals to silicon-bonded hydrogen atoms of component (b);
(d) from about 1 to about 250 parts per million of platinum catalyst; and
(e) a sufficient amount of surface treated filler having sufficient nitrogen on its surface to lower foam density.
2. The composition of claim 1 wherein said vinyl-containing polysiloxane contains from about 0.001 to about 1% by weight vinyl.
3. The composition of claim 1 wherein said x varies such that the viscosity of the polymer varies from 2500 to 500,000 centipoise at 25° C.

4. The composition of claim 1 wherein R and $R^1$ are selected from the class consisting of alkyl radicals of 1 to 8 carbon atoms, aryl radicals, vinyl radicals, and halogenated hydrocarbon radicals of 3 to 8 carbon atoms.

5. The composition of claim 1 wherein R is vinyl and $R^1$ is selected from the group consisting of methyl, phenyl, and 3,3,3-trifluoropropyl.

6. The composition of claim 1 which contains from 5 to 30 parts by weight component (b).

7. The composition of claim 1 wherein said hydride polysiloxane has a viscosity between about 5 and 100 centipoise at 25° C.

8. The composition of claim 1 wherein said hydroxyl source is selected from the group consisting of water and combinations of water with organic alcohol or hydroxylated siloxane.

9. The composition of claim 1 wherein said hydroxyl source is selected from the group consisting of hydroxylated siloxane and combinations of hydroxylated siloxane with water or organic alcohol.

10. The composition of claim 1 wherein said hydroxylated siloxane has an average of from greater than 1 to 2.5 silicon-bonded hydroxyl radicals per molecule.

11. The composition of claim 1 wherein said organic alcohol is a substituted or unsubstituted alcohol having from 1 to 12 carbon atoms.

12. The composition of claim 11 wherein organic alcohol is selected from the group consisting of ethanol, propanol, butanol, lauryl alcohol, octyl alcohol and ethylene glycol.

13. The composition of claim 1 wherein the ratio of hydroxyl radicals to hydride radicals varies between 0.02/1 and 1/1.

14. The composition of claim 1 wherein said treated filler has from 1 to 2000 ppm visible nitrogen.

15. The composition of claim 1 wherein said treated filler has from 25 to 250 ppm visible nitrogen.

16. The composition of claim 1 wherein said visible nitrogen content of said treat filler ranges on a weight basis from about 0.1 to about 7.0 ppm based on silicone polymer content.

17. The composition of claim 1 wherein said visible nitrogen content of said treated filler ranges on a weight basis from about 0.2 to 5.0 ppm based on silicone polymer content.

18. The composition of claim 1 wherein said visible nitrogen content of said treated filler ranges from a weight ratio of about 0.003/1 to a ratio of 0.180/1 relative to platinum metal.

19. The composition of claim 10 wherein said visible nitrogen content of said treated filler ranges from a weight ratio of 0.006 to a ratio of 0.12 relative to platinum metal.

20. The composition of claim 1 wherein said filler is treated with an amine of the formula:

$$NR_3^4$$

where $R^4$ is selected from the group consisting of hydrogen, hydroxyl, substituted or unsubstituted alkyl of from 1 to 18 carbon atoms, substituted or unsubstituted aryl of from 1 to 18 carbon atoms, and a substituted or unsubstituted silyl.

21. The composition of claim 20 wherein said filler is heat treated with said amine.

22. The composition of claim 21 wherein said heat treatment is performed at from 100° C. to 200° C. for up to 24 hours.

23. The composition of claim 20 wherein at most $R^4$ is hydroxy and at least one $R^4$ is selected from the group consisting of substituted alkyl of from 1 to 18 carbon atoms, substituted or unsubstituted aryl of from 1 to 18 carbon atoms and substituted or unsubstituted silyl.

24. The composition of claim 20 wherein said substituted or unsubstituted silyl is a substituted or unsubstituted silyl hydrocarbon.

25. The composition of claim 20 wherein said amine compound is selected from the group consisting of diethylhydroxylamine, isopropylamine, hexamethyldisilazane, and triethanolamine.

26. A foamable composition comprising:
(a) 100 parts by weight of a vinyl-containing polysiloxane of the formula:

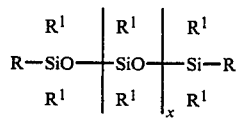

where R and $R^1$ are selected from substituted or unsubstituted hydrocarbon radicals of from 1 to 20 carbon atoms, such that the polymer contains from 0.0002 to 3% by weight vinyl and x varies such that the viscosity of the polymer varies from 100 to 1,000,000 centipoise at 25° C.;

(b) from 1 to 50 parts by weight of a hydride polysiloxane of the formula:

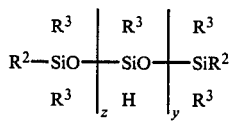

where $R^2$ is selected from the group consisting of, independently, hydrogen, alkyl radicals of from 1 to 8 carbon atoms, aryl radicals of from 1 to 8 carbon atoms, haloalkyl radicals of 3 to 8 carbon atoms and simultaneously, a single —O— to form a cyclic polymer, and $R^3$ is selected from the group consisting of alkyl radicals of from 1 to 8 carbon atoms, aryl radicals of from 1 to 8 carbon atoms, and fluoroalkyl radicals of 3 to 8 carbon atoms, where the hydride polysiloxane has a hydrogen content varying from 0.3 to 1.6% by weight and z and y vary such that the polymer has a viscosity varying from 1 to 500 centipoise at 25° C.;

(c) a hydroxyl source selected from the group consisting of water, organic alcohol, hydroxylated siloxane, and combinations thereof in an amount to provide a molar ratio of from about 0.02/1 to about 5/1 of hydroxyl radicals to silicon-bonded hydrogen atoms of component (b);

(d) from about 1 to about 250 parts per million of platinum catalyst; and (e) an amount of treated filler having visible nitrogen on its surface to supply a visible nitrogen content ranging on a weight basis from about 0.1 to 7.0 ppm based on silicone polymer.

27. The foamable composition of claim 1 wherein said visible nitrogen content ranges on a weight basis from about 0.2 to about 5.0.

28. The composition of claim 26 wherein said treated filler has from 1 to 2000 ppm visible nitrogen.

29. The composition of claim 26 wherein said treated filler has from 25 to 250 ppm visible nitrogen.

30. The composition of claim 26 wherein said filler is treated with an amine of the formula:

$$NR_3^4$$

where $R^4$ is selected from the group consisting of hydrogen, hydroxyl, substituted or unsubstituted alkyl of from 1 to 18 carbon atoms, substituted or unsubstituted aryl of from 1 to 18 carbon atoms, and a substituted or unsubstituted silyl.

31. The composition of claim 30 wherein said filler is heat treated with said amine.

32. The composition of claim 31 wherein said heat treatment is performed at from 100° C. to 200° C. for up to 24 hours.

33. The composition of claim 30 wherein at most $R^4$ is hydroxy and at least one $R^4$ is selected from the group consisting of substituted alkyl of from 1 to 18 carbon atoms, substituted or unsubstituted aryl of from 1 to 18 carbon atoms and substituted or unsubstituted silyl.

34. The composition of claim 30 wherein said substituted or unsubstituted silyl is a substituted or unsubstituted silyl hydrocarbon.

35. The composition of claim 30 wherein said amine compound is selected from the group consisting of diethylhydroxylamine, isopropylamine, hexamethyldisilazane, and triethanolamine.

36. A foamable composition comprising:
(a) 100 parts by weight of a vinyl-containing polysiloxane of the formula:

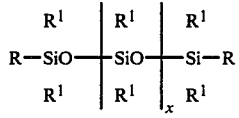

where R and $R^1$ are selected from substituted or unsubstituted hydrocarbon radicals of from 1 to 20 carbon atoms, such that the polymer contains from 0.0002 to 3% by weight vinyl and x varies such that the viscosity of the polymer varies from 100 to 1,000,000 centipoise at 25° C.;
(b) from 1 to 50 parts by weight of a hydride polysiloxane of the formula:

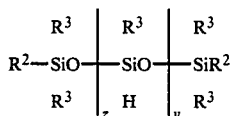

where $R^2$ is selected from the group consisting of, independently, hydrogen, alkyl radicals of from 1 to 8 carbon atoms, aryl radicals of from 1 to 8 carbon atoms, haloalkyl radicals of 3 to 8 carbon atoms and simultaneously, a single —O— to form a cyclic polymer, and $R^3$ is selected from the group consisting of alkyl radicals of from 1 to 8 carbon atoms, aryl radicals of from 1 to 8 carbon atoms, and fluoroalkyl radicals of 3 to 8 carbon atoms, where the hydride polysiloxane has a hydrogen content varying from 0.3 to 1.6% by weight and z and y vary such that the polymer has a viscosity varying from 1 to 500 centipoise at 25° C.;
(c) a hydroxyl source selected from the group consisting of water, organic alcohol, hydroxylated siloxane, and combinations thereof in an amount to provide a molar ratio of from about 0.02/1 to about 5/1 of hydroxyl radicals to silicon-bonded hydrogen atoms of component (b);
(d) from about 1 to about 250 parts per million of platinum catalyst; and
(e) an amount of treated filler having visible nitrogen on its surface to supply a visible nitrogen content of from a weight ratio of about 0.003/1 to a ratio of about 0.180/1 relative to platinum metal.

37. The foamable composition of claim 29 wherein said visible nitrogen content ranges from a weight ratio of about 0.006/1 to a ratio of about 0.12/1 relative to platinum metal.

38. The composition of claim 36 wherein said treated filler has from 1 to 2000 ppm visible nitrogen.

39. The composition of claim 36 wherein said treated filler has from 25 to 250 ppm visible nitrogen.

40. The composition of claim 36 wherein said filler is treated with an amine of the formula:

$$NR_3^4$$

where $R^4$ is selected from the group consisting of hydrogen, hydroxyl, substituted or unsubstituted alkyl of from 1 to 18 carbon atoms, substituted or unsubstituted aryl of from 1 to 18 carbon atoms, and a substituted or unsubstituted silyl.

41. The composition of claim 40 wherein said filler is heat treated with said amine.

42. The composition of claim 41 wherein said heat treatment is performed at from 100° C. to 200° C. for up to 24 hours.

43. The composition of claim 40 wherein at most $R^4$ is hydroxy and at least one $R^4$ is selected from the group consisting of substituted alkyl of from 1 to 18 carbon atoms, substituted or unsubstituted aryl of from 1 to 18 carbon atoms and substituted or unsubstituted silyl.

44. The composition of claim 40 wherein said substituted or unsubstituted silyl is a substituted or unsubstituted silyl hydrocarbon.

45. The composition of claim 40 wherein said amine compound is selected from the group consisting of diethylhydroxylamine, isopropylamine, hexamethyldisilazane, and triethanolamine.

46. A foamable composition consisting essentially of:
(a) 100 parts by weight of a vinyl-containing polysiloxane of the formula:

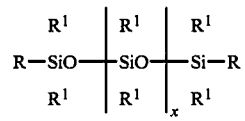

where R and $R^1$ are selected from substituted or unsubstituted hydrocarbon radicals of from 1 to 20 carbon atoms, such that the polymer contains from 0.0002 to 3% by weight vinyl and x varies such that the viscosity of the polymer varies from 100 to 1,000,000 centipoise at 25° C.;

(b) from 1 to 50 parts by weight of a hydride polysiloxane of the formula:

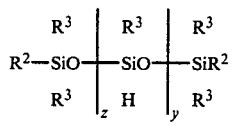

where $R^2$ is selected from the group consisting of independently, hydrogen, alkyl radicals of from 1 to 8 carbon atoms, aryl radicals of from 1 to 8 carbon atoms, haloalkyl radicals of 3 to 8 carbon atoms and simultaneously, a single —O— to form a cyclic polymer and $R^3$ is selected from the group consisting of alkyl radicals of from 1 to 8 carbon atoms, aryl radicals of from 1 to 8 carbon atoms, and fluoroalkyl radicals of 3 to 8 carbon atoms, where the hydride polysiloxane has a hydrogen content varying from 0.3 to 1.6% by weight and z and y vary such that the polymer has a viscosity varying from 1 to 500 centipoise at 25° C.;

(c) a hydroxyl source selected from the group consisting of water, organic alcohol, hydroxylated siloxane, and combinations thereof in an amount to provide a molar ratio of from about 0.02/1 to about 5/1 of hydroxyl radicals to silicon-bonded hydrogen atoms of component (b);

(d) from about 1 to about 250 parts per million of platinum catalyst; and (e) a sufficient amount of surface treated filler having sufficient nitrogen on its surface to lower foam density.

47. A foamable composition consisting essentially of:
(a) 100 parts by weight of a vinyl-containing polysiloxane of the formula:

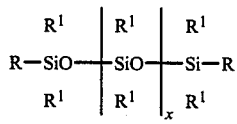

where R and $R^1$ are selected from substituted or unsubstituted hydrocarbon radicals of from 1 to 20 carbon atoms, such that the polymer contains from 0.0002 to 3% by weight vinyl and x varies such that the viscosity of the polymer varies from 100 to 1,000,000 centipoise at 25° C.;

(b) from 1 to 50 parts by weight of a hydride polysiloxane of the formula:

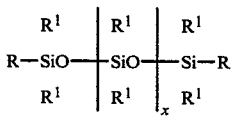

where $R^2$ is selected from the group consisting of, independently, hydrogen, alkyl radicals of from 1 to 8 carbon atoms, aryl radicals of from 1 to 8 carbon atoms, haloalkyl radicals of 3 to 8 carbon atoms and simultaneously, a single —O— to form a cyclic polymer, and $R^3$ is selected from the group consisting of alkyl radicals of from 1 to 8 carbon atoms, aryl radicals of from 1 to 8 carbon atoms, and fluoroalkyl radicals of 3 to 8 carbon atoms, where the hydride polysiloxane has a hydrogen content varying from 0.3 to 1.6% by weight and z and y vary such that the polymer has a viscosity varying from 1 to 500 centipoise at 25° C.;

(c) a hydroxyl source selected from the group consisting of water, organic alcohol, hydroxylated siloxane, and combinations thereof in an amount to provide a molar ratio of from about 0.02/1 to about 5/1 of hydroxyl radicals to silicon-bonded hydrogen atoms of component (b);

(d) from about 1 to about 250 parts per million of platinum catalyst; and (e) an amount of treated filler having visible nitrogen on its surface to supply a visible nitrogen content ranging on a weight basis from about 0.1 to 7.0 ppm based on silicone polymer.

48. A foamable composition consisting essentially of:
(a) 100 parts by weight of a vinyl-containing polysiloxane of the formula:

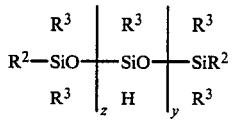

where R and $R^1$ are selected from substituted or unsubstituted hydrocarbon radicals of from 1 to 20 carbon atoms, such that the polymer contains from 0.0002 to 3% by weight vinyl and x varies such that the viscosity of the polymer varies from 100 to 1,000,000 centipoise at 25° C.;

(b) from 1 to 50 parts by weight of a hydride polysiloxane of the formula:

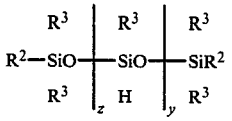

where $R^2$ is selected from the group consisting of, independently, hydrogen, alkyl radicals of from 1 to 8 carbon atoms, aryl radicals of from 1 to 8 carbon atoms, haloalkyl radicals of 3 to 8 carbon atoms and simultaneously, a single —O— to form a cyclic polymer, and $R^3$ is selected from the group consisting of alkyl radicals of from 1 to 8 carbon atoms, aryl radicals of from 1 to 8 carbon atoms, and fluoroalkyl radicals of 3 to 8 carbon atoms, where the hydride polysiloxane has a hydrogen content varying from 0.3 to 1.6% by weight and z and y vary such that the polymer has a viscosity varying from 1 to 500 centipoise at 25° C.;

(c) a hydroxyl source selected from the group consisting of water, organic alcohol, hydroxylated siloxane, and combinations thereof in an amount to provide a molar ratio of from about 0.02/1 to about 5/1 of hydroxyl radicals to silicon-bonded hydrogen atoms of component (b);

(d) from about 1 to about 250 parts per million of platinum catalyst; and (e) an amount of treated filler having visible nitrogen on its surface to supply a visible nitrogen content of from a weight ratio of about 0.003/1 to a ratio of about 0.180/1 relative to platinum metal.

* * * * *